United States Patent
Epshteyn

(10) Patent No.: US 7,011,051 B2
(45) Date of Patent: Mar. 14, 2006

(54) HYBRID TWO CYCLE ENGINE, COMPRESSOR AND PUMP, AND METHOD OF OPERATION

(76) Inventor: Grigoriy Epshteyn, 804 Rossville Ave., Staten Island, NY (US) 10309

( * ) Notice: Subject to any disclaimer, the term of this patent is extended or adjusted under 35 U.S.C. 154(b) by 153 days.

(21) Appl. No.: 10/638,024

(22) Filed: Aug. 8, 2003

(65) Prior Publication Data

US 2005/0028759 A1 Feb. 10, 2005

(51) Int. Cl.
*F02B 71/00* (2006.01)

(52) U.S. Cl. .................. 123/46 R; 417/364; 60/400
(58) Field of Classification Search .......... 123/46 R, 123/74 R, 74 B, 74 C, 62, 66, 71 R, 65 VD; 417/364; 60/400, 402–405; 180/305, 165

See application file for complete search history.

(56) References Cited

U.S. PATENT DOCUMENTS

| | | | |
|---|---|---|---|
| 4,102,128 A | * 7/1978 | Shafer et al. ............... | 60/400 |
| 4,326,380 A | 4/1982 | Rittmaster .................. | 60/595 |
| 4,362,477 A | 12/1982 | Patten ....................... | 417/364 |
| 4,369,021 A | 1/1983 | Heintz ....................... | 417/364 |
| 4,876,991 A | 10/1989 | Galitello .................... | 123/46 E |
| 4,924,956 A | 5/1990 | Deng et al. ................. | 180/65.3 |
| 5,036,667 A | 8/1991 | Thatcher ..................... | 60/595 |
| 5,167,292 A | 12/1992 | Moiroux et al. ............. | 180/165 |
| 5,261,797 A | 11/1993 | Christenson ................ | 417/380 |
| 5,464,331 A | 11/1995 | Sawyer ....................... | 417/364 |
| 5,556,262 A | 9/1996 | Achten et al. .............. | 417/364 |
| 5,616,010 A | 4/1997 | Sawyer ....................... | 417/364 |
| 6,293,231 B1 | 9/2001 | Valentin .................... | 123/46 R |

* cited by examiner

*Primary Examiner*—Henry C. Yuen
*Assistant Examiner*—Hyder Ali

(57) ABSTRACT

The hybrid comprises a two-cycle engine, boosted by the engine power compressor and a hydraulic pump. The pump plunger fastened to engine piston and located coaxially with the compressor piston and pump rotor, provide direct energy transmission to the compressor and pump. The plunger and compressor piston, each connected to one of two diametrically opposite axial push rods, of the rotor. The push rods synchronize and balance the pistons, which move opposite directions into underside of the engine piston space. The reducer synchronizes the separate rotors motion, activate engine and compressor camshafts and conventional accessory units. The engine can be high power started and restarted irrespective of parking time. Because of direct energy transmission the hybrid increases efficiency and specific power, while minimizing the weight, installation space and fuel consumption necessary in particular for automobile hydrostatic transmission.

16 Claims, 8 Drawing Sheets

HYBRID TWO CYCLE ENGINE, COMPRESSOR AND PUMP, AND METHOD OF OPERATION

CROSS-REFERENCE TO RELATED APPLICATIONS

Not Applicable

FEDERALLY SPONSORED RESEARCH

Not Applicable

SEQUENCE OF THE INVENTION

Not Applicable

BACKGROUND OF THE INVENTION

Field of Invention

This invention relates to hydrostatic transmission, specifically to a system of internal combustion engine and pump, which are used for high pressurized fluid flow generation of such transmission.

BACKGROUND OF THE INVENTION

The widespread engine and pump system with hydrostatic transmission is used to drive wheels and working equipment of widely known machinery-mountainous, construction, agricultural, transportation automotive and other heavy equipment.

System engine-pump are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,326,380 to Ritmasterl (1982), U.S. Pat. No. 4,362,477 to Patten (1982), U.S. Pat. No. 4,369,021 to Heintz (1983), U.S. Pat. No. 4,876,991 to Galitello (1989), U.S. Pat. No. 4,924,956 to Deng et al. (1990), U.S. Pat. No. 5,036,667 to Thatcher (1991), U.S. Pat. No. 5,167,292 to Moiroux et al. (1992), U.S. Pat. No. 5,261,797 to Christenson (1993), U.S. Pat. No. 5,464,331 to Sawyer (1995), U.S. Pat. No. 5,556,262 to Achten et al. (1996), U.S. Pat. No. 5,616,010 to Sawyer (1997), U.S. Pat. No. 6,293,231 to Valentin (2001).

While these devices fulfill their respective, particular objective and requirements, the aforementioned patents do not describe a hybrid two cycle engine, compressor and pump and method of operation for providing increased efficiency and specific power while minimizing the weight, installation space and fuel consumption.

The engine and pump system in widespread use suffer from the following known disadvantages:

(a) The conventional system of generating high pressurized fluid flow for hydrostatic transmission has two separate units: the engine and the pump with large weight and installation space. Also this system uses a four cycle internal combustion engine. The two cycle engine has a great potential advantage—with a power stroke for each revolution; but has a big problem with boosting power by air blowing.

(b) Increasing the regular engine power by air supercharger or turbocharger system is complicated, noisy, expensive, uses additional space for a blower outside of the engine and uses low pressure and high speed air flow, that is kinetic energy, instead of using static energy, that is air pressure.

(c) The conventional engine transforms reciprocating piston movement to crankshaft rotation by means of a connecting rod. A pump transforms this crankshaft rotation back into reciprocating pump pistons movement by axial mechanism. The two complicated intermediate mechanisms result in large energy losses, weight, installation space, cost and labor because there is no direct energy transmitted.

(d) The complicated engine air compression. The power stroke in one cylinder transforms via a connecting rod into crankshaft rotation. A connecting rod of another cylinder transforms this rotation into piston motion for air compression. The intermediate mechanism decrease efficiency and increases fuel consumption because there is no direct energy transmitted.

(e) The intermediate mechanisms work with considerable cross forces, which press engine and pump pistons against the cylinder wall and thereby decrease engine and pump longevity and efficiency, and increase fuel consumption.

(f) In this system the intermediate mechanism is complicated, expensive and labor intensive because reciprocating piston movement and complex movement of the engine connecting rod must be balanced only by rotation of the crankshaft counter weight.

(g) The air ports of the two cycle engine, located in the bottom cylinder wall prevent the engine piston motion from assisting in removing burned gases. This result in an inefficient exhaust process because only air flow is used for removing the burned gases. This decreases volumetric efficiency and engine power.

(h) The two cycle engine combustion chamber does not fill with fresh air efficiently because it does not use high pressure air. This limits volumetric efficiency and engine power.

(i) Since the air compression in the engine cylinder occurs without additional cooling, thermal efficiency is decreased and fuel consumption is increased.

(j) The conventional pump pistons are located on the periphery of the cylinder block; this results in the piston's shoes having a much greater speed and limits the pump's longevity and power transmission.

(k) In the conventional pump large forces press the pistons against the shoe plate because the fluid pressure is about 4500 psi; this limits the pump power transmission.

(l) Absence of a high power engine starter able to fast start and restart, and which would allow the engine to shut down at every red traffic light, increases fuel consumption.

(m) Absence of a high power engine starter, which would enable quick pedal starting independent of external energy sources.

(n) Absence of a starter able to start if the vehicle is not driven for a lengthy period.

BACKGROUND OF THE INVENTION

Objects and Advantages

Therefore, it can be appreciated that there exists a continuing need for a new and improved hybrid engine-pump for providing increased efficiency and specific power while minimizing weight, installation space and fuel consumption. The present invention substantially fulfills these needs.

The objectives and advantages of the present invention are:

(a) to provide a decrease in weight and installation space by using one compact unit—a hybrid two cycle engine, compressor and pump instead of two conventional separate units engine and pump;

(b) to provide an increase in engine power through use of a high pressure air injection reciprocation compressor, using the space below the engine piston as a compressor chamber, with volume greater than the engine displacement volume;

(c) to provide direct energy transmission from the engine piston to the pump plunger through its stationary connection, thereby increasing efficiency with decreasing fuel consumption;

(d) to provide direct energy transmission by using the interaction between the bottom of the engine piston and top of the compressor piston for air compression, thereby increasing efficiency and decreasing the fuel consumption;

(e) to provide increased longevity and efficiency by moving the engine, compressor pistons and pump plunger without cross forces during the power transmission;

(f) to provide a simple and high quality balancing reciprocating movement by moving the engine and compressor pistons in opposite directions;

(g) to provide an increase in engine power by simultaneously moving the engine piston upward and using the high pressurized air from the receiver which was compressed in the previous stroke while the said engine piston moved downward;

(h) to provide intensive filling of the combustion chamber while the engine piston moves to the top end position and simultaneously super high pressure air is injected from the receiver via the air injection valve within the combustion chamber;

(i) to provide an increase in the engine thermal efficiency via additional air cooling in the receiver;

(j) to provide an increase in the pump power by locating the pump plunger on the rotor centerline;

(k) to provide an increase in the pump power by direct energy transmission from engine piston to pump plunger;

(l) to provide a high power starter able to fast start and restart an engine, and to shut down at every red traffic light with decreased fuel consumption, by using a pneumohydraulic accumulator and the pump plunger in high power hydraulic cylinder mode;

(m) to provide quick pedal starting independent of external energy sources with use of a starter pump and pneumohydraulic accumulator;

(n) to provide starting power even if the vehicle is not driven for a lengthy period by automatically switching on the start and pneumohydraulic accumulator charging process;

Even more objectives and advantages will become apparent from a consideration of the ensuing description and drawings.

SUMMARY OF THE INVENTION

In accordance with the present invention a hybrid two cycle engine, compressor and pump, (which we shall refer to simply as "hybrid") is comprised of a two cycle engine, compressor, pump, synchronize mechanism, reducer, conventional accessory units and electric hydraulic control system associated with a conventional hydraulic motor.

The engine is comprised of a cylinder with cooling system, piston with rings, cylinder head with combustion chamber, camshaft, exhaust manifold and exhaust valve. The piston located between the compressor chamber and combustion chamber, is comprised of an air injection valve.

The compressor is comprised of a piston, camshaft with lobes and the compressor chamber located between the engine and compressor pistons within the engine cylinder. The compressor is comprised of an intake manifold, intake and output valves with springs, which are located on the side surface of engine cylinder. The output valve is coupled with the air injection valve of the engine by a receiver, which is comprised of a water jacket and is located on the side surface of engine cylinder. The compressor piston, fastened to a hub, is comprised of rings. The valves of the compressor are connected with rockers, pivotably mounted by axles, and connected with the lobes of the compressor camshaft. The axles is located on the side surface of engine cylinder.

The pump is comprised of housing, joined to the engine cylinder by a shoe plate, and joined to a valve plate. A rotor is comprised of a cylinder block fastened to an abutment and a plunger fastened to the engine piston. The rotor has a pump chamber with a canal and the plunger, rotor, compressor piston, hub are located coaxially. The rotor is coupled with the shoe plate by a bearing with a spring. The valve plate connected to each rotor by a pump inlet and outlet slots, forming the circumference, and coupled with the pump chamber by the rotor canal. The hybrid pump associated with the hydrostatic transmission conventional motor by pump outlet and inlet lines.

The synchronize mechanism is comprised of compensate pistons, a lever with pin shoe, yoke and two diametrically opposite axial push rods coupled with the shoe plate by shoes outside of the rotor and with the compensate pistons inside the rotor. The lever is pivotably coupled with the cylinder block by sliders and axle, coupled with lower spherical portion of the plunger by sliders and a crossbar, and coupled with the yoke and the first push rod by the pin shoe. The yoke is pivotably coupled with the abutment, and the second push rod is coupled with the yoke by a saddle shoe and with the compressor piston hub by a gland inside of rotor. The abutment has drain bores.

The reducer case is the valve plate and is comprised of bearings and shafts, which are connected to the rotors by toothed clutches, gearwheels, and the camshaft of the compressor. The camshaft of the compressor is connected with a gearwheel of a conic reducer, which has a second gearwheel with a shaft connected with the engine camshaft.

The accessory regular units, cooling system pump, electric system generator, replenishing pump of hydrostatic transmission, and a diesel injection pump are located on the valve plate and the shafts of the reducer are coupled with the units.

The electric hydraulic control system is comprised of a hydraulic distributor with solenoids. The first line of the distributor is connected with the pump inlet line by a check valve, the second line is coupled with a pump outlet line, the third line is coupled with the tank and the fourth line of the distributor is coupled with the electric manometer, pneumohydraulic accumulator and a starter pump, which comprises of a pedal.

There has thus been outlined, rather broadly, some features of the invention in order that the detailed description thereof that follows may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded is limiting.

As such, those skilled in the art will appreciate that the conception, upon which this disclosure is based, may readily be utilized as a basis for the designing of other structures, methods and system for carrying out the several purposes of the present invention. It is important, therefore, that the claims be regarded as including such equivalent constructions insofar as they do not depart from the spirit and scope of the present invention.

It is therefore an object of the present invention to provide a new and improved hybrid, which has all the advantages of the prior art systems engine-pump and none of the disadvantages.

It is another object of the present invention to provide a new and improved hybrid, which may be easily and efficiency manufactured and low price marketed.

It is an object of the present invention to provide a decrease in weight and installation space, while increasing the two cycle engine and pump power with direct energy transmission from engine piston to pump plunger and to compressor piston.

It is a further object of the present invention to provide a less noisy high-power starter, able to fast start and restart, and an engine which will shut down at every red traffic light with decreasing fuel consumption, and to enable the engine to start irrespective of the parking time and by muscle efforts independent of external energy sources.

An even further object of the present invention is to provide high-quality balance and to decrease the vibration.

Even still another object of the present invention is to provide regular accessory systems for the engine and pump, which will reduce the price.

Lastly it is an object of the present invention to provide a new and improved hybrid for increasing the efficiency and specific power, while minimizing the installation space and fuel consumption necessary in particular for an automobile.

In accordance with the present invention a hybrid two cycle engine, compressor and pump, (which we shall refer to simply as "hybrid") is comprised of a two cycle engine, compressor, pump, synchronize mechanism, reducer, conventional accessory units and electric hydraulic control system associated with a conventional hydraulic motor.

The engine is comprised of a cylinder with cooling system, piston with rings, cylinder head with combustion chamber, camshaft, exhaust manifold and exhaust valve. The piston located between the compressor chamber and combustion chamber, is comprised of an air injection valve.

The compressor is comprised of a piston, camshaft with lobes and the compressor chamber located between the engine and compressor pistons within the engine cylinder. The compressor is comprised of an intake manifold, intake and output valves with springs, which are located on the side surface of engine cylinder. The output valve is coupled with the air injection valve of the engine by a receiver, which is comprised of a water jacket and is located on the side surface of engine cylinder. The compressor piston, fastened to a hub, is comprised of rings. The valves of the compressor are connected with rockers, pivotably mounted by axles, and connected with the lobes of the compressor camshaft. The axles is located on the side surface of engine cylinder.

The pump is comprised of housing, joined to the engine cylinder by a shoe plate, and joined to a valve plate. A rotor is comprised of a cylinder block fastened to an abutment and a plunger fastened to the engine piston. The rotor has a pump chamber with a canal and the plunger, rotor, compressor piston, hub are located coaxially. The rotor is coupled with the shoe plate by a bearing with a spring. The valve plate connected to each rotor by a pump inlet and outlet slots, forming the circumference, and coupled with the pump chamber by the rotor canal. The hybrid pump associated with the hydrostatic transmission conventional motor by pump outlet and inlet lines.

The synchronize mechanism is comprised of compensate pistons, a lever with pin shoe, yoke and two diametrically opposite axial push rods coupled with the shoe plate by shoes outside of the rotor and with the compensate pistons inside the rotor. The lever is pivotably coupled with the cylinder block by sliders and axle, coupled with lower spherical portion of the plunger by sliders and a crossbar, and coupled with the yoke and the first push rod by the pin shoe. The yoke is pivotably coupled with the abutment, and the second push rod is coupled with the yoke by a saddle shoe and with the compressor piston hub by a gland inside of rotor. The abutment has drain bores.

The reducer case is the valve plate and is comprised of bearings and shafts, which are connected to the rotors by toothed clutches, gearwheels, and the camshaft of the compressor. The camshaft of the compressor is connected with a gearwheel of a conic reducer, which has a second gearwheel with a shaft connected with the engine camshaft.

The accessory regular units, cooling system pump, electric system generator, replenishing pump of hydrostatic transmission, and a diesel injection pump are located on the valve plate and the shafts of the reducer are coupled with the units.

The electric hydraulic control system is comprised of a hydraulic distributor with solenoids. The first line of the distributor is connected with the pump inlet line by a check valve, the second line is coupled with a pump outlet line, the third line is coupled with the tank and the fourth line of the distributor is coupled with the electric manometer, pneumohydraulic accumulator and a starter pump, which comprises of a pedal.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

DRAWINGS—FIGURES

Figure 1:
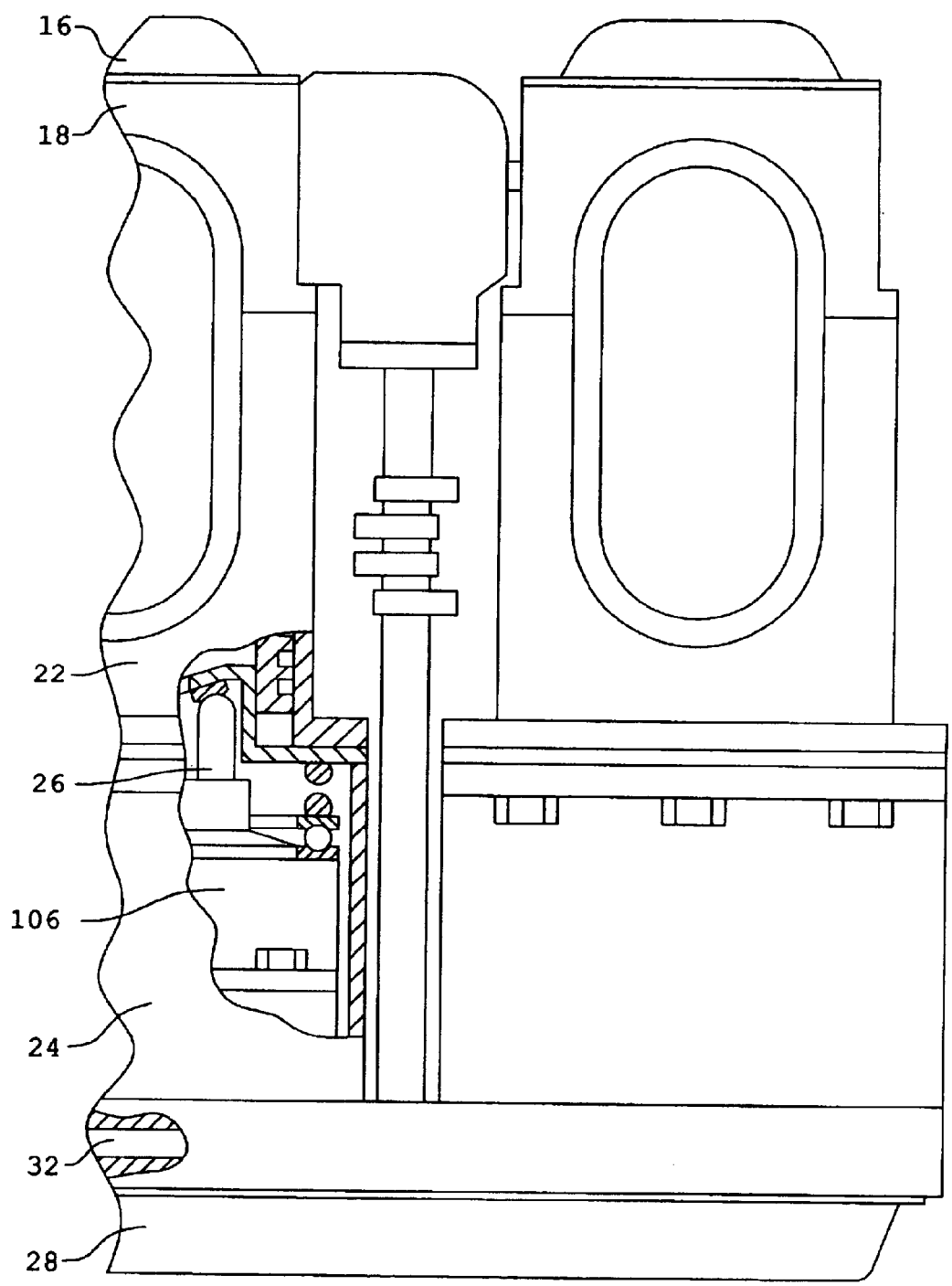
Figure 2:
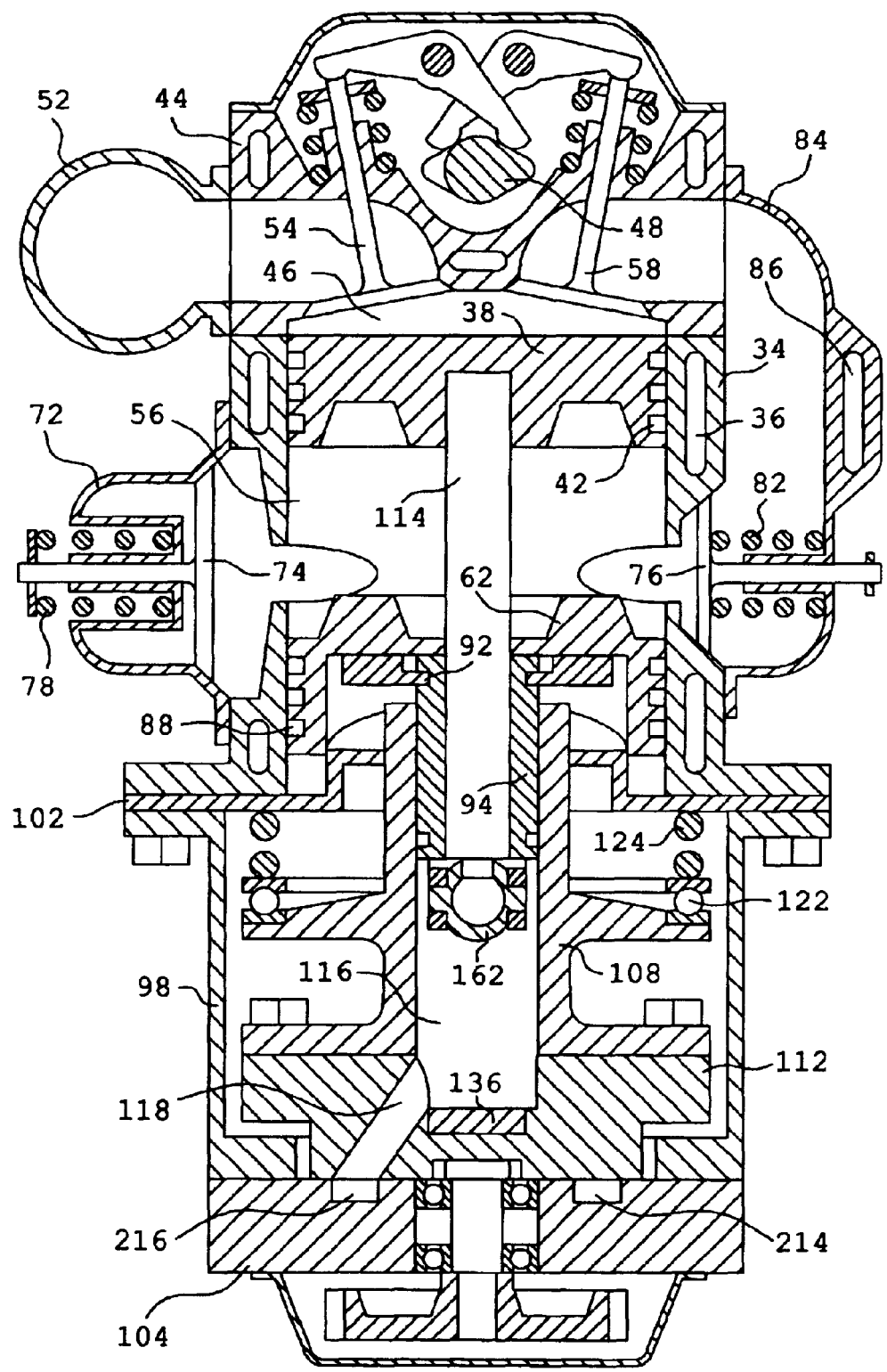
Figure 3:
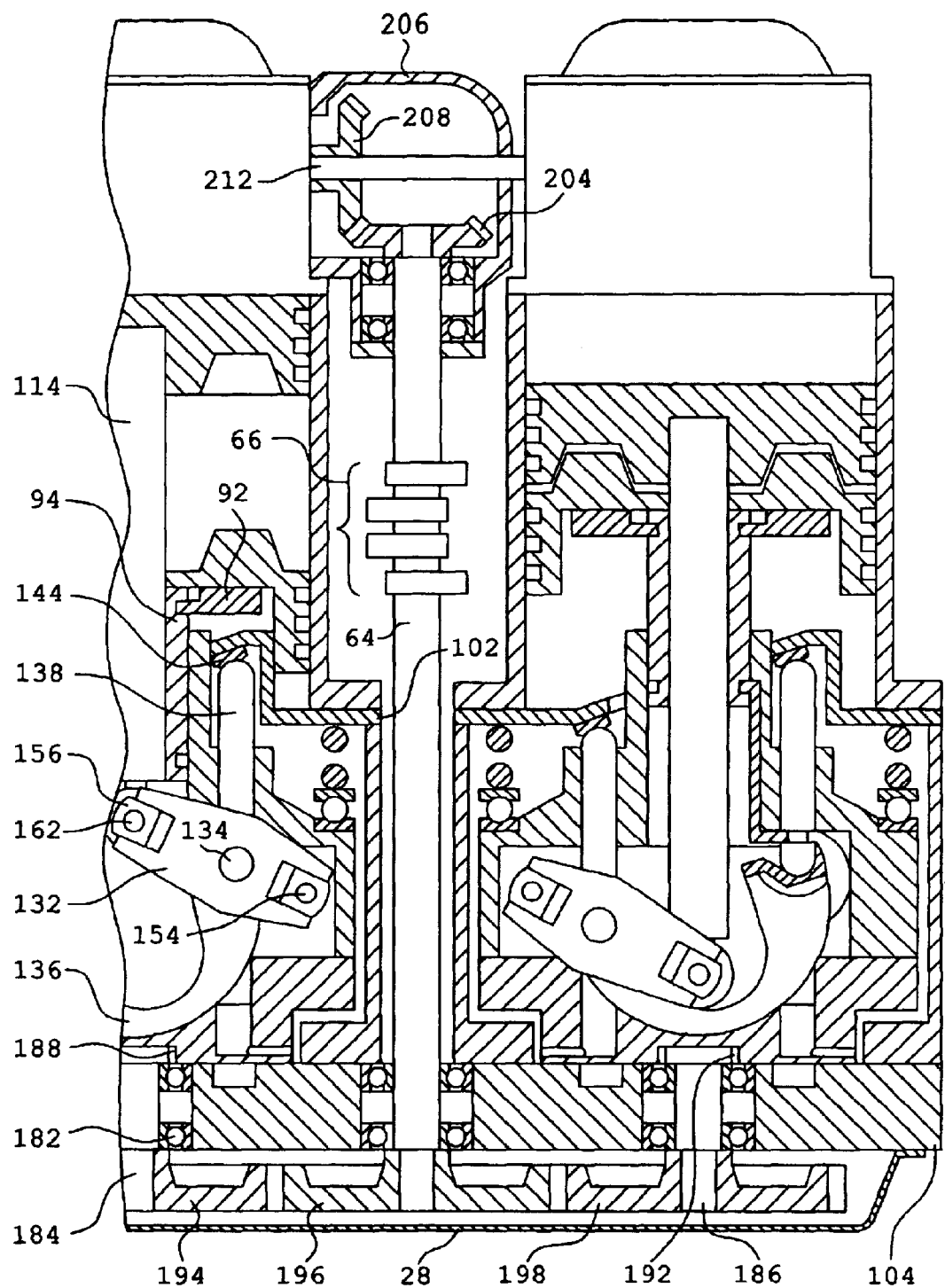
Figure 4:
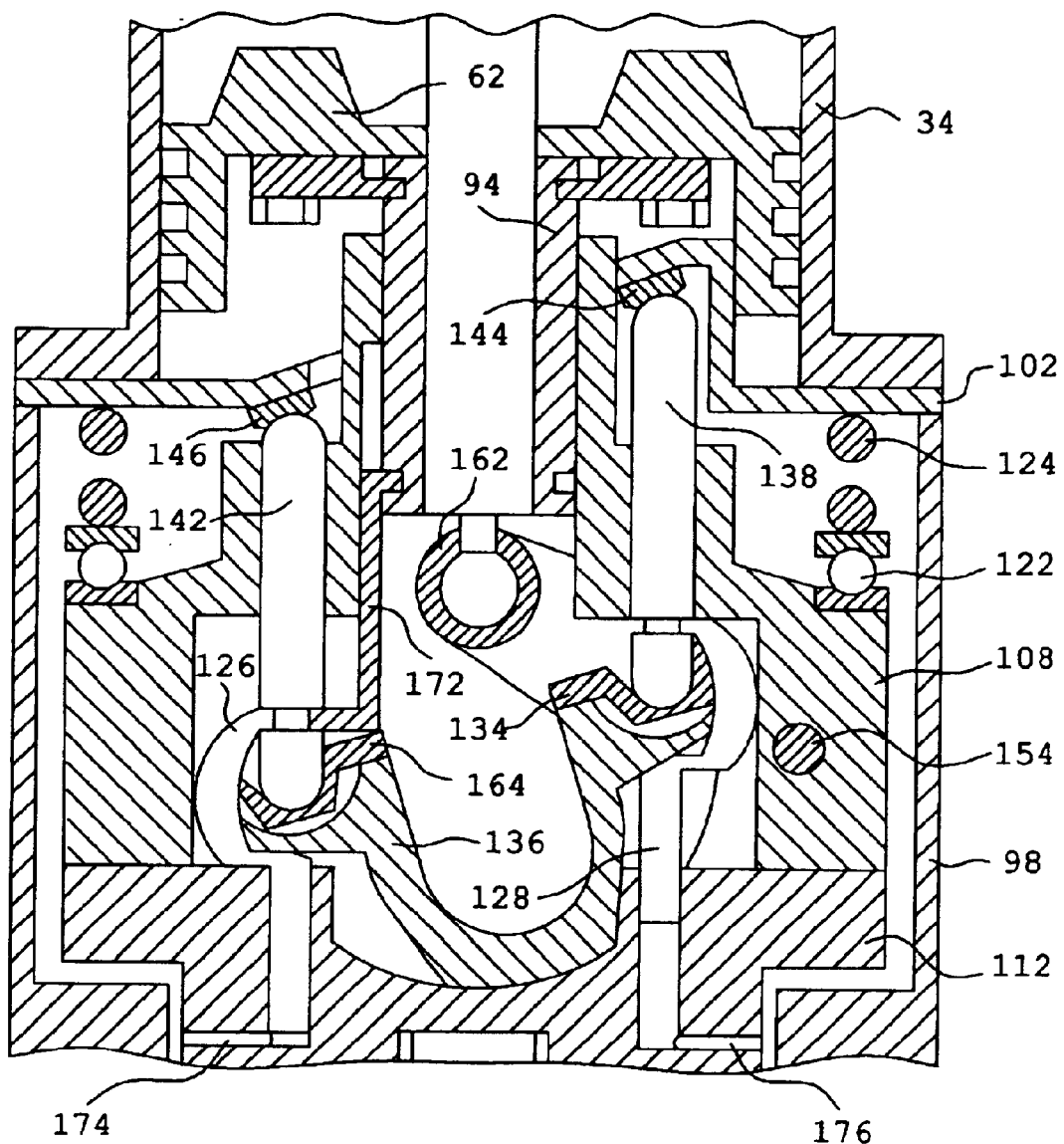
Figure 5:
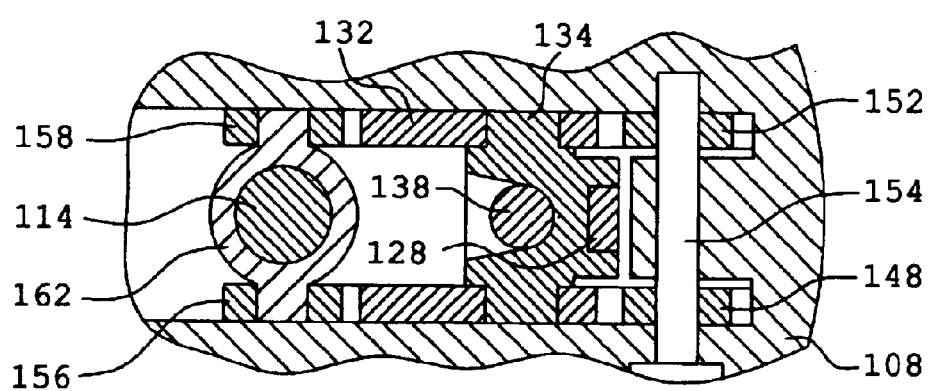
Figure 6:
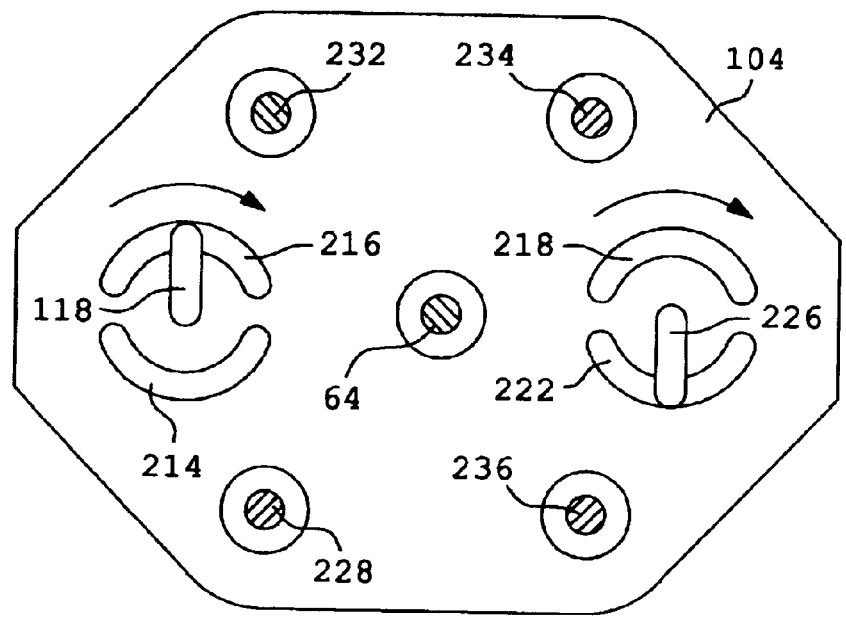
Figure 7:
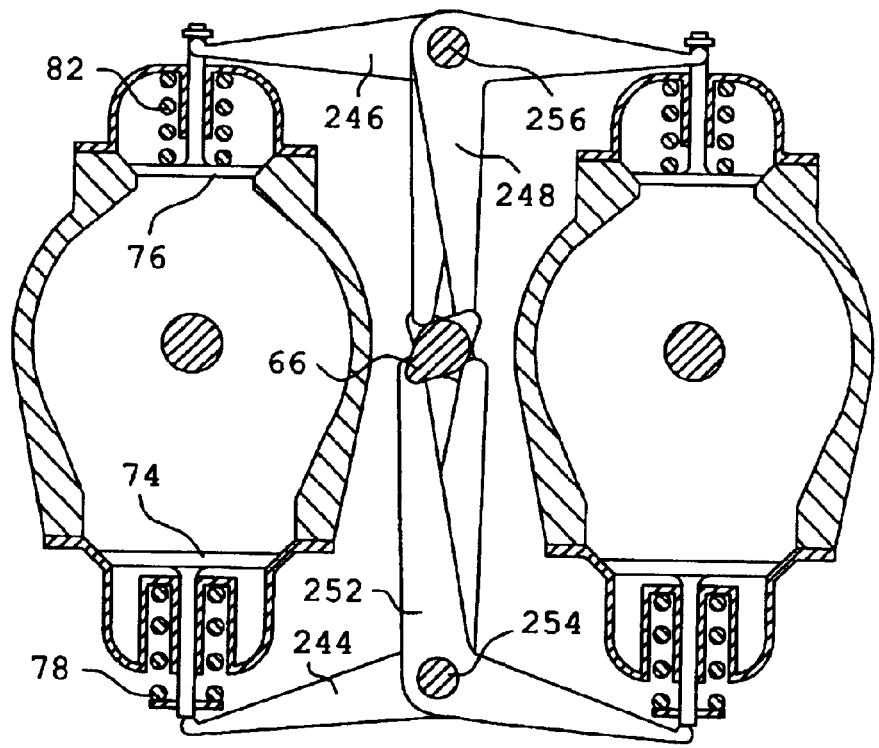
Figure 8:
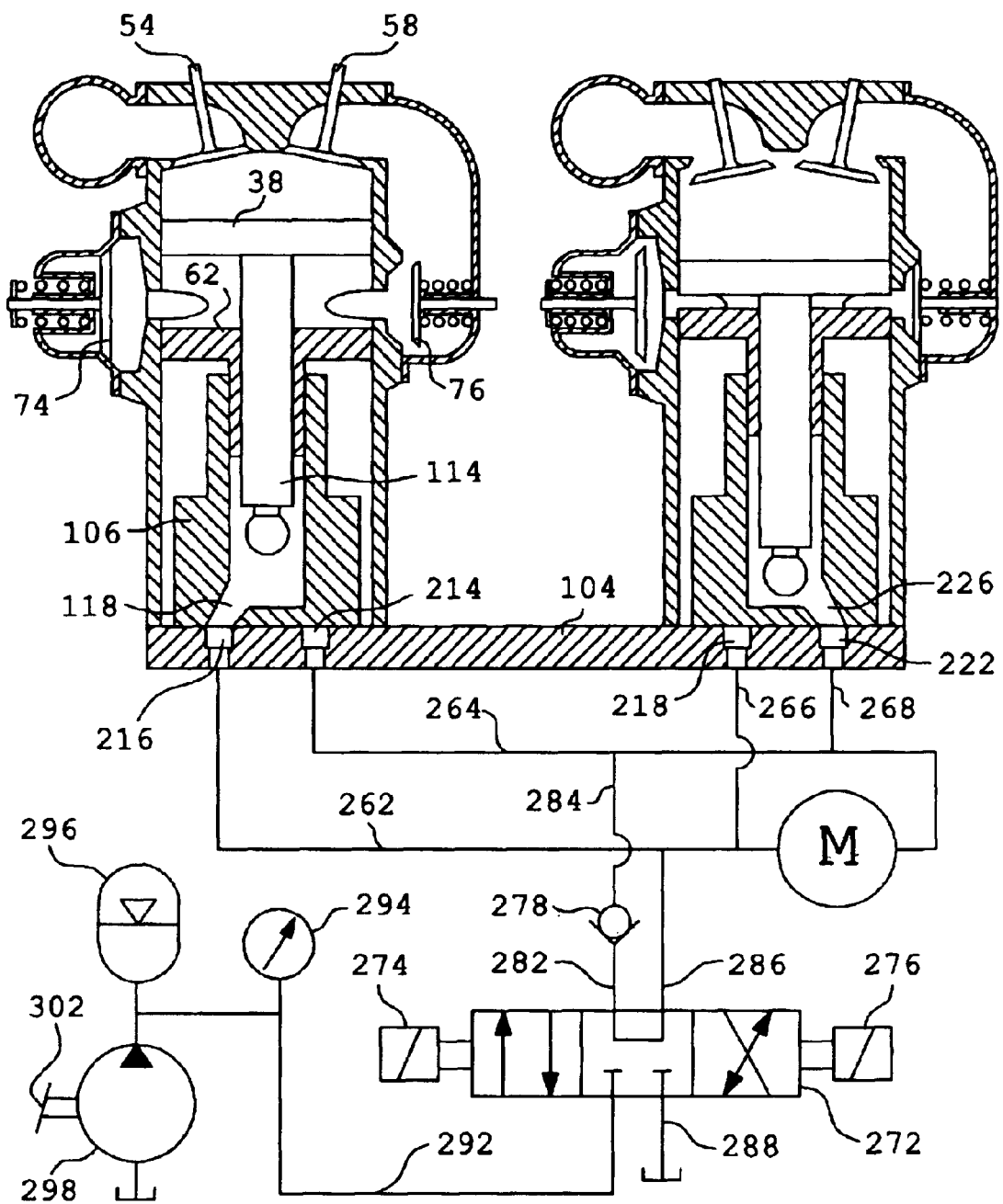
Figure 9A:
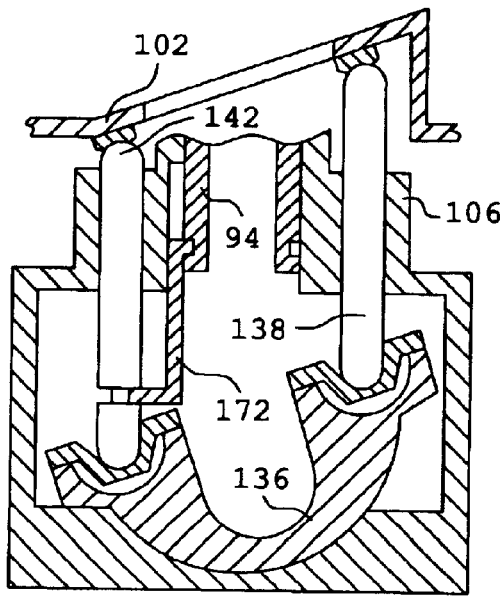
Figure 9B:
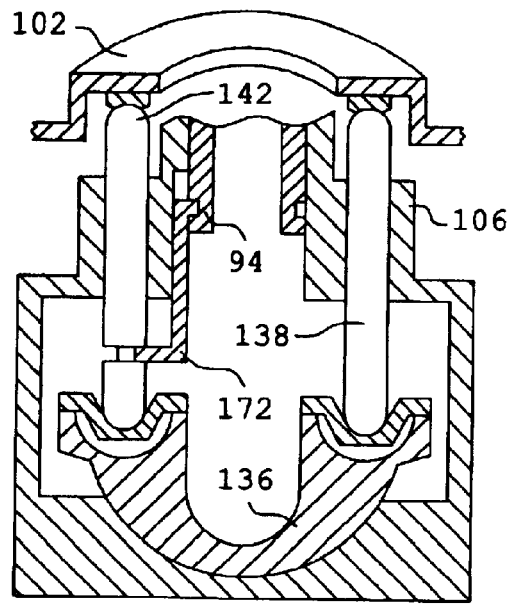
Figure 9C:
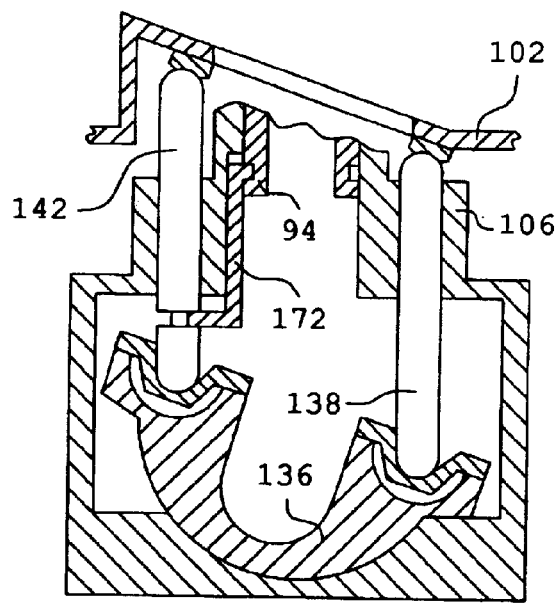

FIG. 1 shows a preferred embodiment of the two cylinders hybrid in accordance with the principles of the present invention;

FIG. 2 shows a section along the one cylinder axis of the present invention;

FIG. 3 shows a section along the two cylinder axis of the present invention;

FIG. 4 shows a section along the push rods axis of the synchronize mechanism of the present invention;

FIG. 5 shows a section along the lever of the synchronize mechanism of the present invention;

FIG. 6 shows a section along the valve plate of the present invention;

FIG. 7 shows a cross section of cylinders with the compressor valves of the present invention;

FIG. 8 shows a hydraulic diagram of the present invention;

FIGS. 9A to 9C show an operating sequence of the synchronize mechanism of the present invention;

FIGS. 10A to 10D show an operating sequence of hybrid of the present invention.

The same reference numerals refer to the same parts through the various figures.

DRAWINGS - Reference Numerals

| | |
|---|---|
| 16 hybrid | 18 engine |
| 22 compressor | 24 pump |
| 26 synchronize mechanism | 28 reducer |
| 32 hydraulic control system | 34 engine cylinder |
| 36 engine cooling system | 38 engine piston |
| 42 engine piston rings | 44 cylinder head |
| 46 combustion chamber | 48 engine camshaft |
| 52 exhaust manifold | 54 exhaust valve |
| 56 compressor chamber | 58 air injection valve |
| 62 compressor piston | 64 compressor camshaft |
| 66 compressor camshaft lobes | 72 compressor intake manifold |
| 74 compressor intake valve | 76 compressor output valve |
| 78, 82 springs | 84 receiver |
| 86 water jacket of receiver | 88 compressor piston rings |
| 92 compressor piston holder | 94 compressor piston hub |
| 98 pump housing | 102 shoe plate |
| 104 valve plate | 106 rotor |
| 108 cylinder block | 112 abutment |
| 114 plunger | 116 pump chamber |
| 118 canal of rotor | 122 bearing of rotor |
| 124 spring of rotor | 126, 128 compensate pistons |
| 132 lever | 134 pin shoe |
| 136 yoke | 138, 142 push rods |
| 144, 146 shoes | 148, 152 sliders |
| 154 axle | 156, 158 sliders |
| 162 crossbar | 164 saddle shoe |
| 172 gland (sliding holder) | 174, 176 drain bores |
| 182 bearing of reducer | 184, 186 shafts |
| 188, 192 toothed clutches | 194, 196, 198 gearwheels |
| 204 gearwheel | 206 conic reducer |
| 208 gearwheel | 212 shaft |
| 214, 216, 218, 222 slots | 226 canal of rotor |
| 228, 232, 234, 236 shafts | 244, 246, 248, 252 rockers |
| 254, 256 axles | 262, 264 hydraulic lines |
| 266, 268 hydraulic lines | 272 hydraulic distributor |
| 274, 276 solenoids | 278 check valve |
| 282, 284, 286 hydraulic lines | 288, 292 hydraulic lines |
| 294 electric manometer | 296 pneumohydraulic accumulator |
| 298 starter pump | 302 pedal of starter pump |

DETAILED DESCRIPTION

With reference now to the drawings, and in particular, to FIGS. 1 through 10 thereof, the preferred embodiment of the new and improved hybrid embodying the principles and concepts of the present invention will be described.

Specifically, it will be noted in the various Figures that the device relates to a hybrid for providing increased efficiency and specific power while minimizing the weight, and fuel consumption, necessary in particular for automobile hydrostatic transmission.

The hybrid two cycle engine, compressor and pump, further hybrid, is comprised two cycle engine, compressor, pump, synchronize mechanism, reducer, conventional accessory units and electric hydraulic control system associated with a hydraulic motor of hydrostatic transmission.

The hybrid 16 (FIG. 1) is comprised of a two cycle engine 18 compressor 22, pump 24, synchronize mechanism 26, reducer 28 and hydraulic control system 32 associated with a conventional hydraulic motor, represented in FIG. 8 by an encircled 'M' of hydrostatic transmission. The conventional accessory units not illustrated.

The engine 18 is comprised of the cylinder 34 (FIG. 2) with cooling system 36, piston 38 with rings 42, cylinder head 44 with combustion chamber 46, camshaft 48, exhaust manifold 52 and exhaust valve 54. The piston 38 located between compressor chamber 56 and combustion chamber 46 is comprised of an air injection valve 58.

The compressor 22 is comprised of the piston 62, camshaft 64 (FIG. 3) with lobes 66. The compressor chamber 56 (FIG. 2) located between the engine and compressor pistons within engine cylinder is comprised of an intake manifold 72, intake and output valves 74, 76 with springs 78, 82 are located on the side surface of engine cylinder. The output valve 76 is coupled with the air injection valve 58 by a receiver 84, which is comprised of a water jacket 86 and is located on the side surface of engine cylinder. The compressor piston 62 is comprised rings 88 and fastened by holder 92 to the hub 94.

The pump 24 is comprised of housing 98, joined to the engine cylinder by a shoe plate 102, and joined to a valve plate 104. The rotor 106 (FIG. 1) is comprised of a cylinder block 108 (FIG. 2) fastened to an abutment 112 and a plunger 114 fastened to the engine piston. The rotor is comprised of a pump chamber 116 with canal 118 and the plunger, rotor, compressor piston and hub are located coaxially. The rotor is coupled with the shoe plate by a bearing 122 with spring 124.

The synchronize mechanism 26 is comprised of compensate pistons 126, 128, (FIG. 4), lever 132 (FIG. 3) with pin shoe 134, yoke 136, and two diametrically opposite axial push rods 138, 142 (FIG. 4) coupled with the shoe plate 102 by shoes 144, 146 outside of the rotor and with the compensate pistons 126, 128 inside the rotor. The lever 132 (FIG. 5) is pivotably coupled with the cylinder block 108 by sliders 148, 152 and axle 154, coupled with the lower spherical portion of the plunger by sliders 156, 158 and a crossbar 162. The lever 132 also coupled with the yoke 136 and with the first push rod 138 by the pin shoe 134. The yoke 136 is pivotably coupled with the abutment 112, and the second push rod 142 is coupled with the yoke 136 by a saddle shoe 164 and with the compressor piston hub 94 by a gland 172 (sliding holder). The abutment has drain bores 174, 176.

The separate cylinders' components and their connections are the same but the second cylinder rotor is turned relative to the first cylinder rotor at a 180 degree angle, the phase shift, (FIG. 3).

The reducer 28 case is the valve plate 104 (FIG. 3) and is comprised of bearings 182 and shafts 184, 186, connected with rotors by toothed clutches 188, 192, gearwheels 194, 196, 198, and the camshaft 64 of the compressor. The camshaft of the compressor is connected with gearwheel 204 of the conic reducer 206, which has the second gearwheel 208 and the shaft 212. The shaft 212 is connected (not illustrated) with the engine camshaft 48.

The valve plate 104 (FIG. 6) is comprised of under each rotor, pump inlet and outlet slots 214, 216 of first cylinder and pump outlet and inlet slots 218, 222 of second cylinder, which form the circumferences and are coupled respectively with the first and second cylinder pump chambers by rotors canals 118, 226.

The accessory regular units (not illustrated), cooling system pump, electric system generator, replenishing pump of hydrostatic transmission, diesel injection pump are located on the valve plate and the shafts 228, 232, 234, 236 of the reducer are coupled with the units. The arrows (FIG. 6) shown the rotation direction of rotors and the rotor canals 118, 226 shows schematic.

The valves of compressor (FIG. 7) are connected with the compressor camshaft lobes 66 by rockers 244, 246, 248, 252 pivotably mounted by axles 254, 256.

The pumps of separate cylinders are linked together and associated by hydraulic lines (FIG. 8) 262, 264, 266 268 with the hydrostatic transmission conventional motor, represented in FIG. 8 by an encircled 'M'.

The electric hydraulic control system of hybrid is comprised of the hydraulic distributor 272 (FIG. 8) with solenoids 274, 276. The first line 282 of the distributor is connected with the pumps' inlet line 264 by the check valve 278 and line 284; the second line 286 is coupled with the pumps' outlet line 262; the third line 288 coupled with the tank; and the fourth line 292 of the distributor is coupled with the electric manometer 294, pneumohydraulic accumulator (PHA) 296 and the starter pump 298, which comprises of the pedal 302.

As to the manner of usage and operation of the present invention, the same should be apparent from the above description.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

Description of Operation.

The hybrid has starting, restarting, starting by muscle effort, idling, work and pneumohydraulic accumulator (PHA) charging modes of operation. The operator initiates the start. Switching from start to idle mode is automatic. The work mode is initiated automatically after the accelerator pedal (not illustrated) is depressed. The PHA also is charged automatically.

Starting mode.

The operator switches on the solenoid 274 (FIG. 8) by key ignition (not illustrated). The distributor 272 switches from neutral to the "start" position and connects the lines 292 with 282 and 286 with 288.

During the starting process high pressure fluid goes from the PHA 296 by the lines 292, 282, 284, 264, 268 via the distributor 272 and valve 278 to the pump inlet slots 214, 222 of separate cylinders in turn. The fluid goes from pump outlet slots 216, 218 of separate cylinders in turn via the lines 262, 266, 286, 288 and distributor 272 to the tank without load.

The piston-plunger moves from bottom end position (BEP) to top end position (TEP) and by crossbar 162 (FIG. 3) with sliders 156, 158 (FIG. 5) rotates the lever 132. The lever with sliders 148, 152 rotates relatively to axle 154 and moves the pin shoe 134 with push rod 138 to TEP position. The interaction of the shoe 144 with the shoe plate 102 rotates the rotor. The direction of rotors rotation shows the arrows (FIG. 6) and the rotor canals 118, 226 shows schematic.

The reducer 28 by shafts 184, 64, 186 (FIG. 3) with gearwheels 194, 196, 198 activate the other rotor, the engine and compressor camshafts and conventional accessory units: cooling system pump, electric system generator, replenishing pump of hydrostatic transmission, diesel injection pump (not illustrated).

The reducer with synchronize mechanism provides the piston-plunger movement from BEP to TEP in one rotor and simultaneously the piston-plunger movement from TEP to BEP of the other rotor, because the second rotor is set up with phase shift at 180 degrees. The FIG. 3 illustrates the rotors' orientation and the FIG. 6 shows the rotor canals 118, 226 disposition with phase shift of 180 degrees.

Within one cylinder, during one half revolution, while the rotor canal connects with the pump inlet slot, the outlet slot is closed. During the second half revolution, while the rotor canal connects with the pump outlet slot, the inlet slot is closed.

The separate cylinder pumps' fluid flow communication provides simultaneous connection of the first rotor canal with the outlet slot and of the second rotor canal with the inlet slot with smoother fluid flow.

Such sequences occur in the all the operating modes.

Thus, the separate cylinder pumps in mode of hydraulic cylinder work in turn and provide the engine start up by using the PHA high pressurized fluid with high efficiency.

The engine piston compresses the air in the combustion chamber, and conventional fuel injection (not illustrated) initiates the power stroke of the engine.

Thus operates a high-power hydraulic starter. The starter is able to fast start and restart the engine and enables us to replace the conventional electric starter motor and the alternator. The high pressure fluid enables a quiet starting process to occur, and also enables an engine to shut down at every red traffic light with decreased fuel consumption. This is very valuable in particular for automobiles' hydrostatic transmission.

In starting mode the compensate pistons 126, 128 (FIG. 4) considerably decrease the forces pressing the push rods against the shoe plate, because the compensate pistons and push rods interact within the pump chamber by opposite forces. This provides the engine with a light start.

If the fluid pressure in the PHA is not sufficient (the electric manometer 294 shows fluid pressure value) the starter pump 298 with the pedal 302 provide an opportunity to increase fluid pressure with muscle efforts in the neutral position of the distributor 272. Thus, the hydraulic system enables one to start the engine independent of any external energy sources such as an electric battery, for example, thus providing the autonomous work of a hybrid and engine start, irrespective of parking time.

Idling Mode.

The rotor angular velocity increases after the start up. A speed sensor (not illustrated) switches off the solenoid 274, and the distributor 272 in the neutral, "idling," position connects the line 282 with 286. The lines 288, 292 are closed. The engine automatically switches from starting mode to idling mode. The fluid circulates from the pump outlet to the pump inlet via the lines 262, 286, 282, 284, 264, distributor 272 and valve 278, without load.

Thus during the idling process fluid goes from the pump chamber to the pump outlet slot, but during the starting process high pressurized fluid goes from the PHA to the pump inlet slot.

Figure 10A:
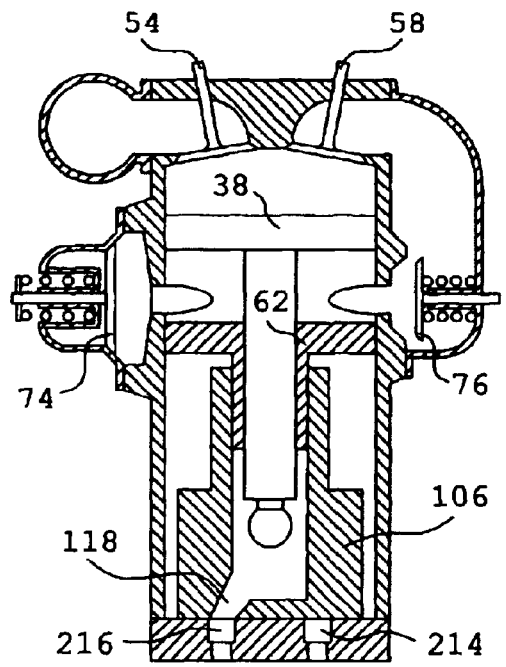

The energy of combustion pressure is transmitted to the piston-plunger during its movement from the TEP to BEP. This process is illustrated in FIG. 10A. The engine valves 54, 58 are closed. The compressor intake valve 74 is closed and the output valve 76 is open.

The piston-plunger assisted by the crossbar 162, (FIG. 3) the sliders 156, 158 (FIG. 5) and the lever 132 moves the pin shoe 134 (FIG. 3) also downward, from the TEP to BEP. The pin shoe assisted by the saddle shoe 164 turns the yoke 136, and depresses the opposite push rod 142 (FIG. 4) and shoe 146 against the shoe plate 102. The interaction of the shoe 146 with the shoe plate 92 rotates one rotor and assisted by the reducer 28 activates the second rotor and moves the engine piston of the second cylinder upward, from BEP to TEP. The direction of rotors rotation shows the arrows (FIG. 6).

The crossbar 162 rotates together with the rotor relative to the plunger sphere, and is actually a bearing, because the plunger is not rotating. Simultaneously the push rod 142 activates the compressor piston movement from BEP to TEP, assisted by gland 172 (sliding holder), and is actually a bearing because the compressor piston is not rotating.

Thus the synchronize mechanism transforms the reciprocating movement of the piston-plunger into rotor rotation, and provides the opposite movement of engine and compressor pistons. This mechanism functions as the in—cylinder synchronize mechanism.

The movement of all components of the synchronize mechanism in oil within pump chamber provides high quality lubrication and increase the efficiency.

The synchronize mechanism and the reducer 28 transfer the engine power stroke, compression stroke of compressor and power stroke of pump plunger in one cylinder, to the simultaneous compression stroke of engine piston and suction strokes of compressor and pump in the other cylinder and also activate the accessory system of the hybrid.

The reducer, connecting the rotors, is the inter cylinder synchronize mechanism.

The FIGS. 9A, 9B, 9C show the synchronize mechanism operating sequence during the first half rotor revolution, and illustrate the push rods, yoke, and gland movement.

The FIG. 9A shows the disposition of the yoke, push rods and the hub into the rotor when the engine piston is in the top end position and the compressor piston is in the bottom end position.

The FIG. 9B shows the disposition of the yoke, push rods and the hub into the rotor when the engine piston and the compressor piston is in the middle position.

The FIG. 9C shows the disposition of the yoke, push rods and the hub into the rotor when the engine piston is in the bottom end position and the compressor piston is in the top end position.

The FIGS. 9A, 9B, 9C illustrate the rotation of the parallelogram formed by the lines connecting the center of upper and lower spherical portion of the push rods. The edge of this parallelogram, which connects the centers of the lower spherical portion of the push rods lies along the yoke's flat surface, which contacts the pin shoe and the saddle shoe.

The yoke rotates simultaneously about two different axes. One axis is the axis of the rotor. The other axis is perpendicular to the rotor axis. The yoke rotates about the latter axis and provides a constant distance between the shoe plate and the yoke's flat surface in the plane of the push rod centerlines. This occurs irrespective of the magnitude or direction of the forces acting on the pistons or plunger.

The rotating parallelogram defines the synchronized movement of the piston-plunger, compressor piston and rotor within each cylinder.

The compressor piston and push rod have equal strokes. The lever gives the piston-plunger an increased stroke, in accordance with the lever ratio.

Thus the opposing movement of the compressor and the engine pistons allows the space under the engine piston to function as chamber of the compressor. This ensures, that the noise is decreased, because static energy is used, that is air pressure, instead of air high speed, i.e. kinetic energy as in a conventional blower. Because the pistons are moving in opposing directions, the engine piston becomes in essence a compressor piston. This results in direct energy transmission for air compression, and provides increased efficiency.

The opposing movement provides simple and high-quality balancing of the system because the compressor piston compensates for the inertial forces influencing the piston with plunger. This decreases the vibration.

The pistons' opposing movement provides a compressor displacement volume greater than the volume of the engine, because it is formed by the superposition of the motions of the engine and compressor pistons. This increases air mass intake and specific power of the engine.

The idling mode continues as long as the accelerator pedal is not depressed.

Work Mode.

The accelerator pedal (not illustrated) depression increases the rotor angular velocity and a speed sensor (not illustrated) switches on the solenoid 276 (FIG. 8). The distributor 272 switches to the "work" position and connects the lines 282 with 288 and 292 with 286.

Thus the distributor automatically switches from idling to work mode if the accelerator pedal is depressed.

The FIGS. 10A, 10B, 10C, 10D illustrates the hybrid operating sequence during a single revolution of the rotor.

The FIG. 10A shows the piston-plunger power stroke and simultaneously the compressor piston power stroke with motion in opposite directions. The engine valves are closed, the compressor output valve are open and the intake valve is closed. The pressurized fluid flow goes from the pump chamber via canal 118 to pump outlet slot 216.

The energy of combustion pressure is transmitted to the piston-plunger during its movement from the TEP to the BEP during a half revolution of the rotor.

The greatest part of the power flow is the high pressured fluid flow which goes directly from the pump outlet slots 216, 218 (FIG. 8), alternately. This power flow goes to the motor 'M' inlet along lines 262, 266.

The simultaneous motion of the upper portion of the pump plunger into the compressor chamber, and the lower portion of the plunger within both the hub of the compressor piston and the rotor provides direct energy transmission. This allows use of one simple unit hybrid instead of two complicated and heavy regular units (an engine and a pump). Also the hybrid solves the problem of using reciprocating engine and compressor without a crankshaft or connecting rods. This increases efficiency and decreases fuel consumption.

The compensate pistons 126, 128 (FIG. 4) interact with the push rods in the pump chamber, reducing the forces which press the push rods against the shoe plate. This increases both the efficiency and the rotor rotation speed. The pump plunger disposition on the rotor's centerline allows a considerable increase in rotor speed rotation and transmission power in comparison with a conventional pump.

All these factors enable us to increase the pump transmission power flow to equal the maximum engine power.

The second, and much smaller, part of the power flow uses the interaction of the underside of the engine piston with the compressor piston to compress air in the compressor chamber and in the receiver 84. The compressor piston motion is provided by fluid pressure on the hub 94 in the pump chamber 116 simultaneously with the pump power stroke, without cross forces and the gland 172 with hub 94 link provides a synchronized function. The air compression with direct energy transmission by means of pump plunger increases efficiency and decreases fuel consumption. The additional air cooling by the receiver water jacket 86 increases the engine thermal efficiency and decreases fuel consumption.

The third and smallest part of the power flow is transmitted to the second rotor by reducer 28. The synchronize mechanism of the second rotor activates the pistons: the compressor piston moves to BEP and the engine piston moves to TEP within the second cylinder. This smallest part of the power flow compresses the air in the combustion chamber, suctions the air in the compressor chamber, intakes the fluid in the pump chamber in the second cylinder, and moves the engine, the compressor camshafts with valves, and the accessory units.

The location of the piston-plunger (inside the cylinder and simultaneously inside the hub 94) and the absence of cross forces as it moves, allow the engine piston length to be minimized. The location of the compressor piston and the hub (simultaneously within the cylinder and the rotor) allows the compressor piston length to be minimized. This provides a compact design, minimizes piston mass and forces of inertia.

Because the inlet of motor 'M' (FIG. 8) is connected to the pneumohydraulic accumulator 296 by the lines 286, 292 and the distributor 272, the motor 'M' uses stable fluid pressure and flow.

In work mode, the synchronize mechanism provides movement of the compressor piston and the rotation of the rotor, in synchronization with the piston-plunger movement, irrespective of the engine load or rate of acceleration.

Thus within each cylinder, the power strokes of the engine, pump and compressor are taking place simultaneously, with direct energy transfer, without any intermediate mechanisms and without a cross force influence from the pistons or the plunger. This minimizes and simplifies the design, and increases the longevity and the efficiency of the hybrid.

In the hybrid, the weight and installation space are smaller than in the conventional system engine-pump thanks to the direct energy transmission.

The working sequence in the separate cylinder components is determined by the reducer, which connects the rotors. This operation sequence increases the pumps' flow stability. Together with the inter cylinder synchronizing function the reducer also activates the compressor camshaft and the engine camshaft, via a conic reducer 206.

The camshafts, the rockers and conic reducer form the synchronize mechanism of the compressor and engine valves. This mechanism provides the engine and compressor valves with motion, with consequent performance in compliance with a two stroke working cycle; and each engine piston stroke from TEP to BEP is a power stroke. The piston-plunger in BEP and the compressor piston in TEP simultaneously complete their power stroke. Air is compressed in the receiver to maximum pressure.

The piston-plunger movement from BEP to TEP occurs simultaneously with the compressor piston movement from TEP to BEP, during a half revolution of the rotor. The compressor intake valve 74 is open, the output valve 76 is closed and the air is sucked into the compressor chamber. Simultaneously the fluid goes to pump chamber 116 via the pump inlet slot 214 and rotor canal 118 during this half rotor revolution.

Because of its location on the side surface of the cylinder, the compressor intake valve diameter can be made much larger than the intake valve of a regular engine, with equal displacement volume. The intake air is cooler because it does not pass through the combustion chamber as with a conventional engine. This increases volumetric efficiency and air mass in the compressor chamber. Such joint factors improve the engine operation in all conditions and particular at low atmospheric pressure, for example, high above sea level.

The engine piston movement from BEP to TEP is comprised of three successive processes: combined clearing, joint compression, and finish compression (of the air in case of diesel, or of the mixture in case of gasoline engine) by the engine piston.

Figure 10B:
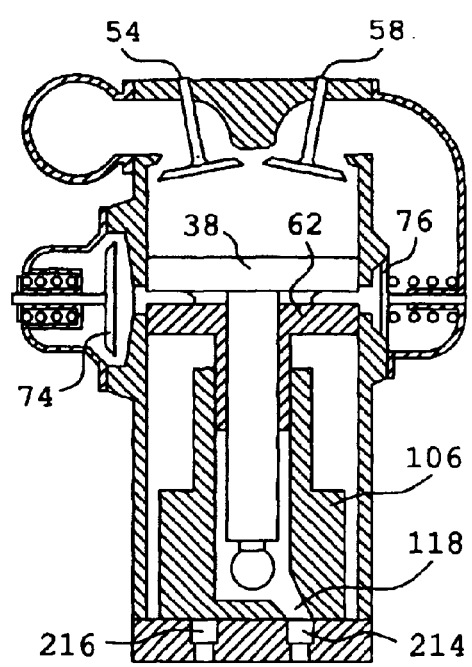

The combined clearing process is shown in the FIG. 10B.

There are three factors in the clearing process.

The valves 52, 54 are open. The piston-plunger moves from BEP to TEP (the first factor) and, simultaneously, high pressurized air, injected from the receiver through the open valves 54 and 58, displaces the burned gases (the second factor). The clearing process provides the high-pressurized air, which was compressed in the previous stroke while the engine piston moved downward.

This combined action intensifies the exhaust process and increases the volumetric efficiency. The additional cooling (intercooling) of air by the water jacket of the receiver is the third factor. Thus the three joint factors improve the exhaust process and increase the specific power of the engine. The combined clearing process ends when the exhaust valve is closed.

Figure 10C:
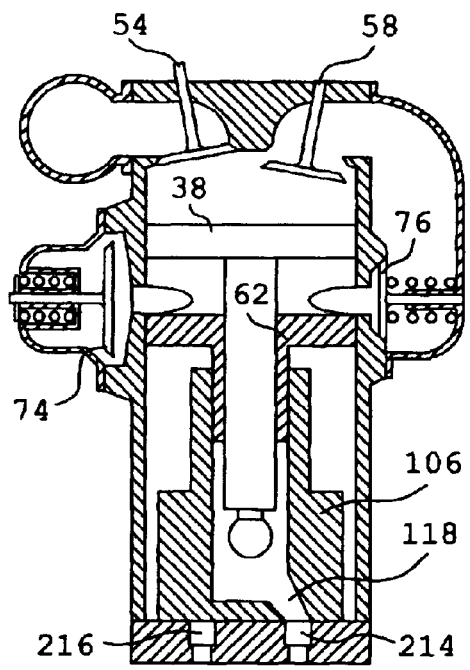

The joint compression process is shown in the FIG. 10C.

The exhaust valve is closed and the air injection valve 58 is open. The engine piston continues movement, and, jointly with the air injection, increases air pressure in the cylinder because the air pressure within the receiver is greater than that within the combustion chamber. The joint compression process ends when the injection valve is closed.

Figure 10D:
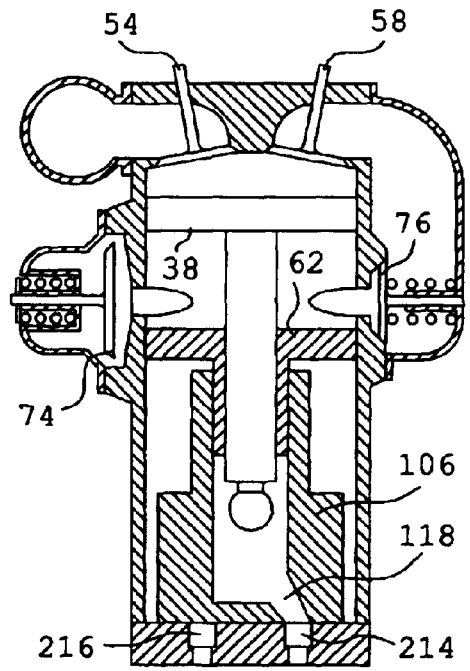

The finish compression process is shown in the FIG. 10D.

The valves 54, 58 are closed. The engine piston continues compression. Before TEP, the pressure in the cylinder becomes maximum. A conventional fuel injection system (not illustrated) provides the start of the engine power stroke. The working cycle ends after one rotor revolution.

Thus the two-cycle engine of the hybrid uses a widely available and inexpensive four cycle engine cylinder head, with the intake valve functioning as an air injection valve. This valve replaces the conventional two cycle engine cylinder wall air ports, and improves the two cycle engine operation. This solves the problem of boosting the two cycle engine power by super high pressurized air injection.

Pneumohydraulic Accumulator Charge Mode.

The PHA fluid pressure decreases after the start up, and the electric manometer 294 signal switches on the solenoid 276. The distributor 272 switches to the "work" position and connects the pump outlet with the hydraulic line 292. The fluid goes from the pump outlet to the PHA. The pressure increases and the electric manometer switches off the solenoid 276, while the accelerator pedal is not depressed.

Thus, after the start, the engine charges the PHA automatically. The hybrid solves the problem of charging a PHA automatically, irrespective of the parking time, even if the fluid pressure is greatly decreased. In that situation, an electric manometer uses the magnitude of PHA fluid pressure as an automatic control signal, and switches the distributor solenoid instead of the previously described process of "start", "idling" and "work" (which require action by an operator). The engine fast charges the PHA and automatically switches off when fluid pressure reaches a maximum. Thus the hybrid readies the engine for next high power, fast start.

The hybrid provides an increase in efficiency and specific power, while minimizing the weight, installation space and fuel consumption.

The hybrid enables at least:
- using a two cycle engine with many cylinders, with either diesel fuel or two cycle gasoline engine. In case diesel is used, a conventional system of injection pump and fuel injector into cylinder head (not illustrated) are used. In case gasoline is used, a conventional fuel injection system with spark plug into cylinder head (not illustrated) is used. In either case a conventional throttle (not illustrated) is used to control the amount of air entering the intake line of compressor
- using conventional fuel, cooling, electric and other accessory systems, engine starts are provided by muscle efforts independent of external energy sources. The hybrid ensures smaller weight and greater power then a serial system engine-pump with equal engine displacement volume
- using the additional engine cooling by the receiver water jacket separately or jointly with the engine water cooling system, or engine cooling by air
- using the pressurized air in the receiver for other purposes, for example, pumping more air into the tires
- using with various kinds of hydrostatic transmission such as variable or fixed displacement conventional motor, closed or open loop; and providing the cylinders of machinery work equipment with high pressurized fluid
- using the hydraulic starter or a conventional alternator with electric starter motor (not illustrated), which activate the reducer
- using the installation in machinery with either orientation of the engine cylinders axis: vertical or horizontal, or the either angle
- using with various kinds of gaseous fuels such as propane, natural gas, methane, hydrogen, etc.
- using the fuel spontaneous combustion (detonation) for more power output per displacement thanks to the direct energy transmission from engine piston to pump plunger.

Thanks to the foregoing advantages the hybrid may be used in trucks, locomotives, boats, aircraft, portable power systems, construction machinery and automobiles.

What is claimed is:

1. A hybrid two-cycle engine, compressor and pump, said engine comprises a cylinders with cylinder heads, within each said cylinder mounted said engine and said compressor pistons and said pump having a rotor comprises two axial rush rods of a synchronize mechanism and said engine piston mechanically coupled to one said rush rod, said compressor piston mechanically coupled to second said push rod and said rotors mechanically coupled by means of reducer associated with accessory units and an electric hydraulic control system associated with at least one hydraulic motor of hydrostatic transmission.

2. The hybrid of claim 1 wherein said engine a cylinder comprises a cooling system, said piston having rings, said cylinder head comprises a combustion chamber, camshaft, exhaust manifold, exhaust valve and said engine piston is located between a chamber of said compressor and said combustion chamber comprises an air injection valve.

3. The hybrid of claim 1 wherein said compressor comprising a camshaft with lobes, said piston having rings and said compressor is a space between said engine and said compressor pistons into said engine cylinder having an intake manifold, intake and output valves with corresponding springs, located on the side surface of said engine cylinder.

4. The hybrid of claim 3 wherein said output valve of said compressor is coupled with an air injection valve of said engine by a receiver, said receiver comprising a water jacket and located on the side surface said engine cylinder.

5. The hybrid of claim 3 wherein said piston fastened to a hub and said valves coupled with said lobes said camshaft of compressor and connected with rockers pivotably mounted by axles located on the side surface said engine cylinder.

6. The hybrid of claim 1 wherein said pump comprising: a housing joined to an engine cylinder by a shoe plate and joined to a valve plate; said rotor comprising a cylinder block fastened to an abutment; a plunger fastened to said engine piston and said plunger, said rotor, said compressor piston with said hub located coaxially.

7. The hybrid of claim 6 wherein said valve plate connected to each rotor by a pump inlet and outlet slots forming a circumference and coupled with said pump chamber by a rotor canal.

8. The hybrid of claim 1 wherein said synchronize mechanism comprising compensate pistons, a lever with a pin shoe, a yoke and said axial push rods located within said rotor diametrically opposite and coupled with a shoe plate by shoes outside of said rotor and wherein said compensate pistons are inside said rotor.

9. The hybrid of claim 8 wherein said lever is pivotably coupled with a cylinder block by sliders and an axle, coupled with lower spherical portion of a plunger by sliders and a crossbar, and coupled with said yoke and a first push rod by said pin shoe inside said rotor.

10. The hybrid of claim 8 wherein said yoke is pivotably coupled with an abutment, a second said push rod coupled with said yoke by a saddle shoe, and with a compressor piston hub by a gland inside said rotor.

11. The hybrid of claim 8 wherein said push rods spherical portion centers located along the yoke's flat surface, which associated with a saddle shoe and said pin shoe and a line connecting said push rods spherical portion center intersected said yoke's turn axis.

12. The hybrid of claim 1 wherein said reducer and a valve plate, comprising: bearings, shafts connecting to rotors by toothed clutches, gearwheels and a compressor camshaft connected with a gearwheel of a conic reducer, which has a second gearwheel with a shaft connected with said engine camshaft.

13. The hybrid of claim 1 wherein said accessory units, cooling system pump, electric system generator, diesel injection pump are located on a valve plate and shafts of a reducer coupled with said accessory units.

14. The hybrid of claim 1 wherein said electric hydraulic control system comprising a hydraulic distributor with solenoids, said hydraulic distributor having four hydraulic lines comprising a first line connected with the pump inlet line by a check valve, a second line coupled with a pump outlet line, a third line coupled with a tank and a fourth line coupled with an electric manometer, a pneumohydraulic accumulator and starter pump comprising a pedal.

15. The hybrid of claim 14 wherein said hydraulic distributor having three position: starting position, which connected said first line with said fourth line and said second line with said third line; idling position, which connected said first line with said second line and said third and fourth lines is closed; work position, which connected said first line with said third line and said second line with said fourth line.

16. A method of hybrid operation comprising the steps of:

(a) boosting engine power by interaction between an underside of an engine piston and a compressor piston within an engine cylinder, and (b) increasing the efficiency by directly compressing the air in a receiver, and subsequently injecting air from said receiver, as said engine piston moves downward or upward with additional air cooling by a receiver water jacket, and (c) increasing the efficiency of a compressor by providing fluid pressure on a compressor piston hub within a pump chamber, thereby activating the power stroke of said compressor piston, simultaneously with the power stroke of a pump, and (d) providing a compressor displacement volume greater than an engine volume and high quality of balancing, by moving said engine piston and said compressor piston in opposite directions, and (e) decreasing fuel consumption by simultaneously moving an upper portion of a pump plunger fastened to said engine piston into a compressor chamber, and lower portion of said plunger moving inside a hub of said compressor piston and a rotor into said pump chamber, and (f) providing fluid flow communication from one cylinder pump during one half revolution, during which a rotor canal connects with a pump inlet slot and an outlet slot is closed, and during the second half revolution during which said rotor canal connects with said pump outlet slot and said inlet slot is closed, and (g) providing fluid flow communication from separate cylinder pumps by simultaneously connecting said first rotor canal with said outlet slot and a second rotor canal with a inlet slot, and (h) synchronizing the opposite movement of said engine and compressor pistons with said rotor motion by interaction of said compressor piston and an axial push rod by a gland with equal strokes, and interaction of said pump plunger with a diametrically opposite axial push rod by a lever which increases said pump plunger stroke, and (i) synchronizing the motion of said push rods, interacting with a shoe plate, outside of said rotor, and with an yoke rotating inside and relative to said rotor with constant distance between said shoe plate and said yoke in the plane of said push rod centerlines, and (j) synchronizing the motion of said separate cylinders' components by a reducer, connecting said rotors, and (k) increasing the efficiency and decreasing the forces pressing said push rods against said shoe plate by interaction of said push rods and compensate pistons with opposite forces, within said pump chamber, and (l) intensifying the exhaust process by simultaneous upward movement of said engine piston, and air injection from the receiver via air injection and exhaust valves into a combustion chamber, and (m) increasing fresh air pressure into said combustion chamber by closing said air injection valve after closing said exhaust valve, and (n) providing for said synchronize mechanism high quality lubrication by moving all components of said synchronize mechanism in oil within pump chamber, and (o) providing for said engine, high power hydraulic starts and restarts, the possibility of starting using muscle efforts, and also idling and work modes, via three separate positions of a distributor: "start" position, which communicates a pneumohydraulic accumulator outlet with said pump inlet; "idling" position, which communicates said inlet and outlet of said pump, and "work" position, which communicates said pneumohydraulic accumulator with said pump outlet and hydraulic motor inlet, and (p) providing said engine start with muscle efforts, independent of external energy sources, by fluidly connecting said pneumohydraulic accumulator with a pump comprising a pedal, and (q) providing said engine start, irrespective of parking time, by automatically switching on successively the "start", "idling", and "work" distributor positions with pneumohydraulic accumulator charging, and using the magnitude of pneumohydraulic accumulator fluid pressure as signal for automatic control.

* * * * *